UNITED STATES PATENT OFFICE.

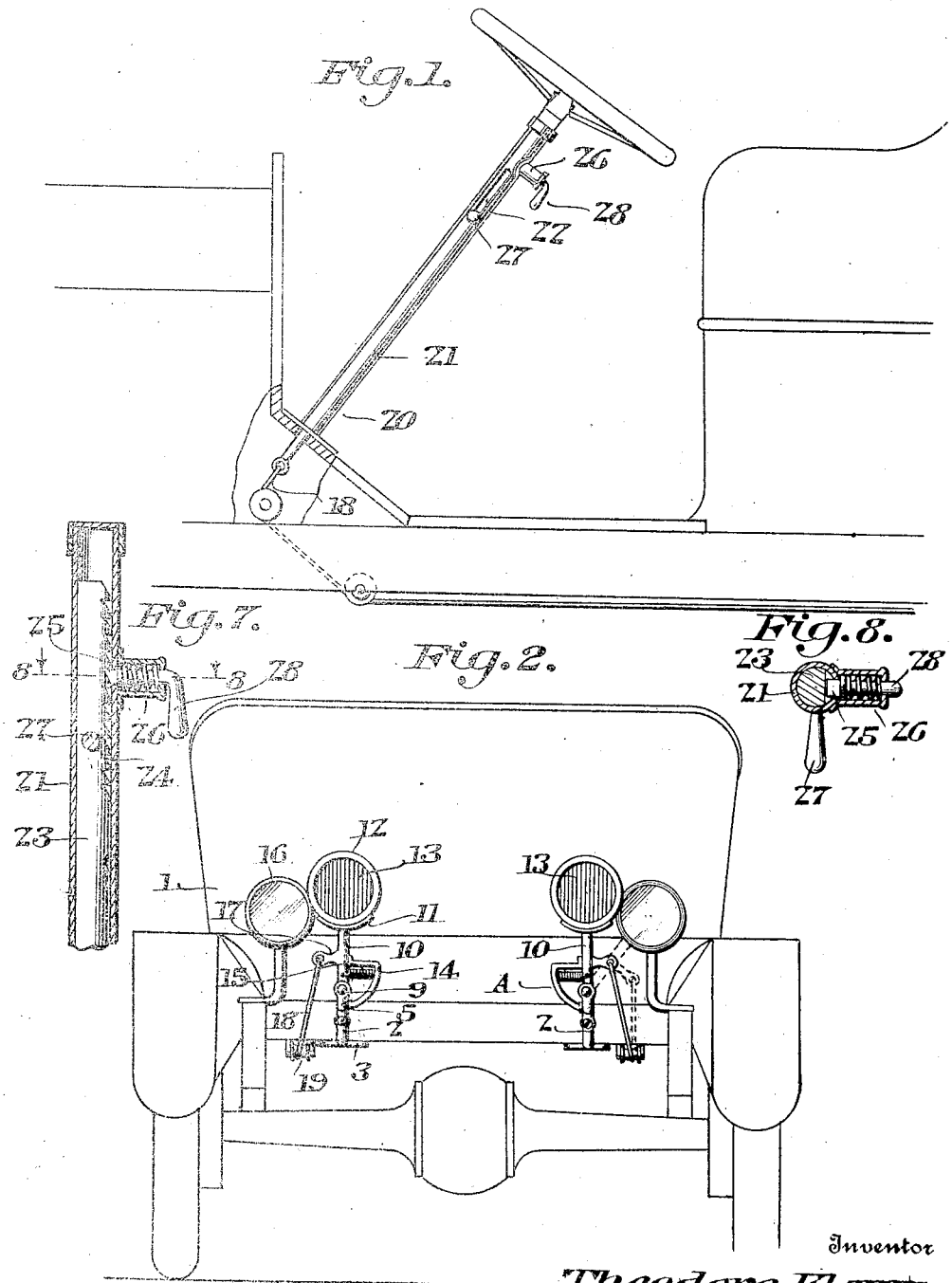

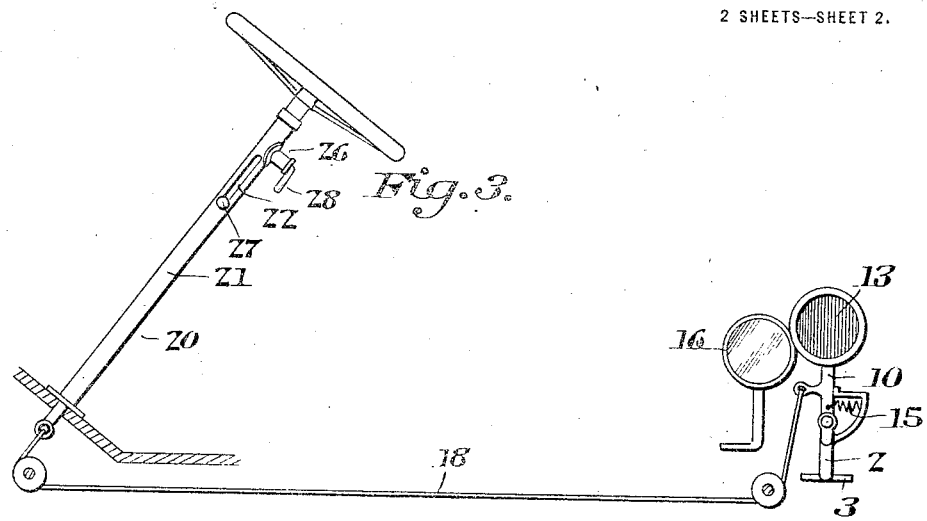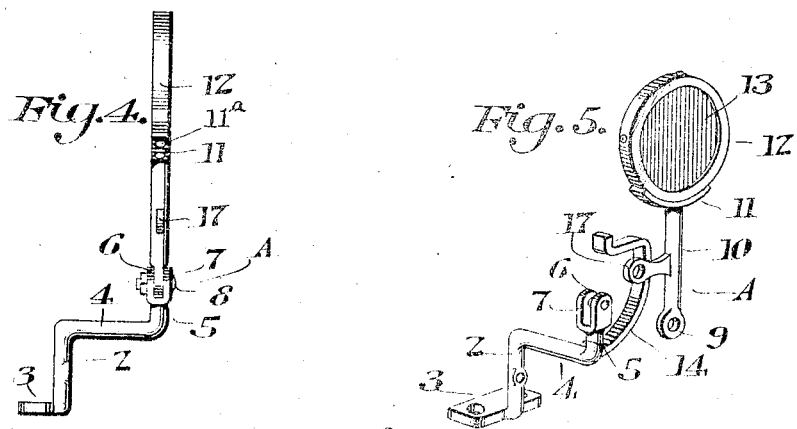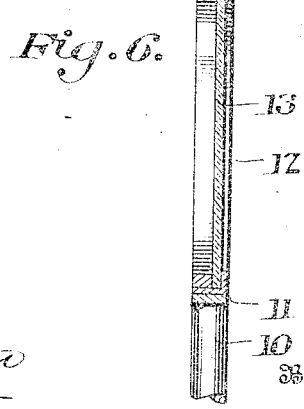

THEODORE KLEMP, OF MUSKEGON, MICHIGAN.

AUTOMOBILE-SIGNAL.

1,155,952.   Specification of Letters Patent.   Patented Oct. 5, 1915.

*To all whom it may concern:*

Be it known that I, THEODORE KLEMP, a citizen of the United States, residing at Muskegon, in the county of Muskegon and State of Michigan, have invented new and useful Improvements in Automobile-Signals, of which the following is a specification.

This invention relates to automobile signals of that type wherein the oscillating arm or signal blade indicates the direction in which a machine is going to turn and has for its primary object the provision of a structure wherein oscillating lenses alternately move into and out of the path of the rays of light emerging from the automobile lamp.

Another object of the invention is to provide a structure wherein the indicating means is visible in the night as well as in the day.

A further object of the invention is to so construct the mechanism that the parts thereof can be readily stamped into their formation so as to decrease the cost of manufacture.

The invention consists in the features of construction, combination, and arrangement of parts, hereinafter fully described and claimed, reference being had to the accompanying drawings, in which:—

Figure 1 is a fragmentary section showing a portion of the mechanism associated with the steering post of an automobile. Fig. 2 is a rear elevation of an automobile showing the signals in their normal position in full lines, the position of one signal being indicated by dotted lines. Fig. 3 is a diagrammatic view of the complete outfit. Fig. 4 is a side elevation of one of the signals. Fig. 5 is a detail view showing the parts of the signal disconnected. Fig. 6 is a section through the lens holder. Fig. 7 is a longitudinal section through the guide tube showing the reciprocating rod in side elevation. Fig. 8 is a section on line 8—8 of Fig. 7.

Referring to the drawing, the numeral 1 designates the rear portion of an automobile upon which is mounted duplicate signals designated in their entirety by the letter A. Each signal comprises a bracket 2 having a flange portion 3 connected to the rear portion of the machine. One extremity of the bracket 2 is bent at right angles as indicated at 4 and offset as indicated at 5 so as to form vertically disposed ears 6 and 7. The ears are apertured so as to accommodate a pin 8 which pivotally connects one extremity 9 of a standard 10 to the bracket. The remaining extremity of the standard 10 is formed with an arcuate shaped flange 11 adapted to conform to the peripheral edge of a lens holder 12 and to be attached thereto by screws 13 as shown in Fig. 4. This lens holder is made of two pieces as indicated in the drawings but it is to be understood that the same can be made of one piece or in any other well known manner.

The lens 13 can be of any color according to the signal which is to be conveyed or if found necessary indicia can be printed thereon. The portion 4 has secured thereto one extremity of a support 14 while the other extremity thereof abuts the standard 10 when the latter is in its normal position. Bridging the distance between and secured to said support and standard 10 respectively is a coil spring 15, the tension of which is utilized to normally hold the standard in a vertical position out of alinement with the automobile lamp 16.

Projecting laterally from the standard 10 is an apertured finger 17. Connected to the aperture of the finger 17 is a flexible cable 18 passing around a pulley 19 and forwardly so as to terminate adjacent the steering post 20 of the automobile. Secured to the steering post or adjacent thereto is a guide tube 21 provided with a longitudinally extending slot 22.

Slidably mounted within the tube 21 is a rod 23 having one of its extremities secured to the terminal of the cable 18. Adjacent the remaining extremity of the rod there is formed a series of teeth 24 adapted to coöperate with a spring pressed dog 25 reciprocating in a casing 26 secured to the side of the tube 21. The rod 23 is further provided with a laterally extending handle 27 slidably mounted within the slot 22. As clearly set forth in the description, it will be seen that upon manipulation of the rod 23 through the medium of the handle 27, the cable will exert a pressure upon the laterally extending fingers 17 with the result that the lens and standard associated therewith will move downwardly in an arc of a circle so as to position the lens 13 in alinement with the rays of light emerging from the automobile lamp. As the rod 23 is slid vertically, the spring pressed dog 25 excessively engages the teeth so as to hold the rod 23 in an elevated position until it is required that the signals be restored to normal position, the teeth then being relieved from the dog upon pressure being applied to the handle 28 formed integrally with the dog.

What I claim is:

1. In combination, a pivotally mounted standard, a lens carried thereby, a laterally extending finger formed on said standard, a cable having one extremity connected to said finger, an upright tube, a rod slidably mounted in said tube and having connection with one extremity of said cable, means for holding said rod in elevated position, and a spring for returning said lens to normal position and to assist the gravitational action of said rod.

2. In combination, a pivotally mounted standard, a lens carried thereby, a laterally extending finger formed on said standard, a cable having one extremity connected to said finger, an upright tube, a rod slidably mounted in said tube and having connection with one extremity of said cable, means for holding said rod in elevated position, and a spring for returning said lens to normal position and to assist the gravitational action of said rod, said means comprising a spring pressed dog adapted to coöperate with the teeth formed adjacent one extremity of said rod.

In testimony whereof I affix my signature in presence of two witnesses.

THEODORE KLEMP.

Witnesses:
 GEORGE D. VANDERWERP,
 JOHN F. HARTSEMA.